(12) United States Patent
Angiulo et al.

(10) Patent No.: US 6,275,829 B1
(45) Date of Patent: Aug. 14, 2001

(54) REPRESENTING A GRAPHIC IMAGE ON A WEB PAGE WITH A THUMBNAIL-SIZED IMAGE

(75) Inventors: Michael Angiulo, Kirkland; Chris Peters, Bellevue, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/977,774

(22) Filed: Nov. 25, 1997

(51) Int. Cl.$^7$ .................................................. G06F 17/30
(52) U.S. Cl. ............................... 707/104; 707/3; 707/10; 707/102; 707/500; 707/513; 345/329; 345/333; 345/334; 345/335
(58) Field of Search .................................. 707/1, 4, 102, 707/104, 3, 10, 500, 513; 345/329, 333, 334, 335

(56) References Cited

U.S. PATENT DOCUMENTS

| | | | |
|---|---|---|---|
| 5,204,947 | * 4/1993 | Bernstein | 345/357 |
| 5,297,249 | * 3/1994 | Bernstein | 345/356 |
| 5,623,589 | * 4/1997 | Needham et al. | 395/160 |
| 5,675,752 | * 10/1997 | Scott et al. | 345/333 |
| 5,708,825 | * 1/1998 | Sotomayor | 707/501 |
| 5,708,826 | * 1/1998 | Ikeda et al. | 707/501 |
| 5,737,599 | * 4/1998 | Rowe et al. | 395/615 |
| 5,751,286 | * 5/1998 | Barber et al. | 345/348 |
| 5,761,655 | * 6/1998 | Hoffman | 707/4 |
| 5,761,686 | * 6/1998 | Bloomberg | 707/529 |
| 5,812,134 | * 9/1998 | Pooser et al. | 345/356 |
| 5,884,056 | * 3/1999 | Steele | 395/339 |
| 5,907,704 | * 5/1999 | Gudmundson et al. | 395/701 |
| 5,999,664 | * 12/1999 | Mahoney et al. | 382/305 |
| 6,026,433 | * 2/2000 | D'Arlach et al. | 709/217 |
| 6,028,603 | * 2/2000 | Wang et al. | 345/350 |
| 6,035,323 | * 3/2000 | Narayen et al. | 709/201 |
| 6,075,530 | * 6/2000 | Lucas et al. | 345/339 |

OTHER PUBLICATIONS

Danny Goodman, "The Complete Hyper Card 2.2 Handbook," Fourth Edition, Randam House, pages, 1993.*

* cited by examiner

Primary Examiner—Jack Choules
Assistant Examiner—Cheryl R. Lewis
(74) Attorney, Agent, or Firm—Ronald M. Anderson

(57) ABSTRACT

An original (full size) image is automatically represented by a thumbnail (reduced size) image on a Web page. A user selects the original image that will be represented by the thumbnail image. The thumbnail image is produced and placed into a Web page that is being created or edited. While viewing the Web page, selection of the thumbnail image causes a hyperlink to the original image that is automatically associated with the thumbnail image to be traversed, so that the original image is retrieved and displayed. An auto thumbnail tool dialog box enables the user to define the size of the thumbnail image and to optionally select a border and/or a beveled edge for the thumbnail image. The coloring and the pattern of the border may also be optionally selected by the user.

51 Claims, 9 Drawing Sheets

```
200
   DOCUMENT URL: HTTP://WWW.MICROSOFT.COM/FIGURE1.HTML

<HTML>
   <HEAD>
   <TITLE>FIGURE 1</TITLE>
   </HEAD>
   <BODY>
202 THE NEXT LINE HAS THE BASE ELEMENT.
   <BASE HREF="HTTP://WWW.ACME.COM/PRESS/RELEASE1.HTML">
204 THE NEXT LINE HAS A HYPERTEXT LINK WITH AN ABSOLUTE URL.
   <A HREF="HTTP://WWW.RESEARCH.COM/STATUS/REPORT.HTML"></A>
206 THE NEXT LINE HAS A HYPERTEXT LINK WITH A RELATIVE URL.
   <A HREF="RELEASE2.HTML"></A>
   </BODY>
   </HTML>
208
   THE RELATIVE URL REFERS TO: HTTP://WWW.ACME.COM/PRESS/RELEASE2.HTML
```

*FIG. 9*

```
210
   DOCUMENT URL: HTTP://WWW.MICROSOFT.COM/FIGURE2.HTML

<HTML>
   <HEAD>
   <TITLE>FIGURE 2</TITLE>
   </HEAD>
   <BODY>
   THIS DOCUMENT HAS NO BASE ELEMENT.
212 THE NEXT LINE HAS A HYPERTEXT LINK WITH AN ABSOLUTE URL.
   <A HREF="HTTP://WWW.RESEARCH.COM/STATUS/REPORT.HTML"></A>
214 THE NEXT LINE HAS A HYPERTEXT LINK WITH A RELATIVE URL.
   <A HREF="RELEASE2.HTML"></A>
   </BODY>
   </HTML>
216
   THE RELATIVE URL REFERS TO: HTTP://WWW.MICROSOFT.COM/RELEASE2.HTML
```

*FIG. 10*

218
DOCUMENT URL: HTTP://WWW.MSN.COM/SAILING.HTML

```
<HTML>
220 <BODY>
    <P><IMG SRC="SAILBOAT.GIF" ALIGN=LEFT>
    SAILING IS RELAXING
222 </P>
    </BODY>
    </HTML>
```

218
DOCUMENT URL: HTTP://WWW.MSN.COM/SAILING.HTML

```
<HTML>
<BODY>
224 <P>
    <IMG SRC="LITTLESAILBOAT.GIF" ALIGN=LEFT>
    SAILING IS RELAXING
222 </P>
    </BODY>
    </HTML>
```

218
DOCUMENT URL: HTTP://WWW.MSN.COM/SAILING.HTML

```
<HTML>
<BODY>
226 <P>
224 <A HREF="HTTP://WWW.MSN.COM/IMAGES/SAILBOAT.GIF">
    <IMG SRC="LITTLESAILBOAT.GIF" ALIGN=LEFT>
    SAILING IS RELAXING
222 </A>
    </P>
    </BODY>
    </HTML>
```

REPRESENTING A GRAPHIC IMAGE ON A WEB PAGE WITH A THUMBNAIL-SIZED IMAGE

FIELD OF THE INVENTION

The present invention generally relates to inserting an image in a document that is accessed over a network, and more specifically, to the inclusion of a reduced size or "thumbnail" image representing a larger image in a Web page that is to be accessible over the Internet or an Intranet, so that the thumbnail image represents the original image and so that the original image is retrieved and displayed in the Web page by selecting the thumbnail image.

BACKGROUND OF THE INVENTION

An on-line information system typically includes one computer system (a server) that makes information available so that other computer systems (clients) can access the information. The server manages access to the information, which can be structured as a set of independent on-line services. The server and client communicate via messages conforming to a communication protocol and sent over a communication channel such as a computer network or through a dial-up connection.

Information sources managed by the server may include files, databases, and applications on the server system or on an external computer system. The information that the server provides may simply be stored on the server, may be converted from other formats manually or automatically, may be computed on the server in response to a client request, may be derived from data and applications on the server or other machines, or may be derived by any combination of these techniques.

The user of an on-line service typically uses a browser program executed on the client system to access the information managed by the on-line service. The browser enables the user to selectively view, search, download, print, edit, and/or file the information managed by the server. On-line services are available on the World Wide Web (WWW), which operates over the global Internet. The Internet interconnects a large number of otherwise unrelated computers or sites. Similar services are available on private networks called Intranets that may not be connected to the Internet, and through local area networks (LANs). The WWW and similar private architectures provide a "web" of interconnected document objects. On the WWW, these document objects are located at various sites on the global Internet. A more complete description of the WWW is provided in "The World-Wide Web," by T. Berners-Lee, R. Cailliau, A. Luotonen, H. F. Nielsen, and A. Secret, *Communications of the ACM,* 37 (8), pp. 76–82, August 1994, and in "World Wide Web: The Information Universe," by Berners-Lee, T., et al., in *Electronic Networking: Research, Applications and Policy*, Vol. 1, No. 2, Meckler, Westport, Conn., Spring 1992.

Among the types of document objects in an on-line service are documents and scripts. Documents that are published on the WWW are written in the Hypertext Markup Language (HTML). This language is described in *HyperText Markup Language Specification*—2.0, by T. Berners-Lee and D. Connolly, RFC 1866, proposed standard, November 1995, and in "World Wide Web & HTML," by Douglas C. McArthur, in Dr. Dobbs Journal, December 1994, pp. 18–20, 22, 24, 26 and 86. Many companies are also developing enhancements to HTML. HTML documents can be created using programs specifically designed for that purpose or by executing script files.

The HTML language is used for writing hypertext documents, which are more formally referred to as Standard Generalized Markup Language (SGML) documents that conform to a particular Document Type Definition (DTD). An HTML document includes a hierarchical set of markup elements; most elements have a start tag, followed by content, followed by an end tag. The content is a combination of text and nested markup elements. Tags, which are enclosed in angle brackets ('<' and '>'), indicate how the document is structured and how to display the document, as well as destinations and labels for hypertext links. There are tags for markup elements such as titles and headers, text attributes such as bold. and italic, lists, paragraph boundaries, links to other documents or other parts of the same document, in-line graphic images, and for many other features.

The following lines of exemplary HTML briefly illustrate how the language is used:

Some words are <B>bold</B>, others are <I>italic</I>.
       Here we start a new paragraph.<P>Here's a link to the
       <A HREF="http://www.microsoft.com">Microsoft
       Corporation </A>home page.

This sample document is a hypertext document because it contains a hypertext link to another document in the line that includes "HREF=." The format of this link is described below. A hypertext document may also have a link to other parts of the same document. Linked documents may generally be located anywhere on the Internet. When a user is viewing the document using a web browser, the links are displayed as highlighted words or phrases. For example, using a web browser, the sample document above might be displayed on the user's screen as follows:

Some words are bold, others are italic. Here we start a new paragraph.
    Here's a link to Microsoft Corporation home page.

In a web browser, the link may be selected, for example, by clicking on the highlighted area with a mouse. Typically, the screen cursor changes when positioned on a hypertext link. Selecting a link will cause the associated document to be displayed. Thus, clicking on the highlighted text "Microsoft Corporation" would fetch and display the associated home page for that entity.

Similarly, the HTML language also provides a mechanism (the image or "IMG" element) that enables an HTML document to include an image that is stored as a separate file. When the end user views the HTML document, the included image is displayed as part of the document, at the point where the image element was positioned in the document. The following line of HTML briefly illustrates how the language is used to incorporate an image into an HTML document:

<IMG SRC="bigsailboat.gif">

The following line of HTML shows how the language provides a hyperlink from a displayed thumbnail image (littlesailboat.gif) to the original (fullsize) image (bigsailboat.gif):

<A HREF="bigsailboat.gif"><IMG SRC="littlesailboat.gif"></A>

When the user is viewing the Web page that includes the displayed thumbnail image using a web browser, the hyperlink connection from the thumbnail image to the original image is activated by the selection of the displayed thumbnail image. In the prior art, it has been necessary to manually create the hyperlink from a thumbnail image to the original fullsize image, so that the original image is retrieved and displayed when the user selects the thumbnail image.

Each document object in a web has an identifier called a Universal Resource Identifier (URI). These identifiers are described in more detail in T. Berners-Lee, *"Universal Resource Identifiers in WWW: A Unifying Syntax for the Expression of Names and Addresses of Objects on the Network as used in the World-Wide Web,"* RFC 1630, CERN, June 1994; and T. Berners-Lee, L. Masinter, and M. McCahill, *"Uniform Resource Locators (URL),"* RFC 1738, CERN, Xerox PARC, University of Minnesota, December 1994. A URL allows any object on the Internet to be referred to by name or address, such as in a link in an HTML document as shown above. There are two types of URIs: a Universal Resource Name (URN), and a Uniform Resource Locator (URL). A URN references an object by name within a given name space. The Internet community has not yet defined the syntax of URNs. A URL references an object by defining an access algorithm using network protocols. An example of a URL is "bttp://www.microsoft.com". A URL has the syntax "scheme://host:port/path/search" where "scheme" identifies the access protocol (such as HTTP, FTP or GOPHER);

"host" is the Internet domain name of the machine that supports the protocol;

"port" is the transmission control protocol (TCP) port number of the appropriate server (if different from the default);

"path" is a scheme-specific identification of the object; and

"search" contains optional parameters for querying the content of the object.

URLs are also used by web servers and browsers on private computer systems, Intranets, or networks, and not just for the WWW.

There are generally two types of URLs that may be used in the hypertext link: absolute URLs, and relative URLs. An absolute URL includes a protocol identifier, a machine name, and an optional HTTP port number. A relative URL does not include a protocol identifier, machine name or port, and must be. interpreted relative to some known absolute URL called the base URL. The base URL is used to determine the protocol identifier, machine name, optional port and base directory for a relative URL. For further discussion of URL format and usage, see the document "Uniform Resource Locators," Internet Request for Comments (RFC) 1738, by T. Berners-Lee, L. Masinter, M. McCahill, University of Minnesota, December 1994. For further discussions of relative URL format and usage, see "Relative Uniform Resource Locators," RFC 1808, by R. Fielding, University of California, Irvine, June 1995.

A hypertext link to an electronic document is specified by one of several HTML elements. One of the parameters of an HTML element for a hypertext link is the Uniform Resource Locator (URL) that serves as the identifier for the target of the link. An HTML document may have a base element defining an absolute URL that specifies the base URL for that document. If the document has no base element, then the absolute URL of the document is used as the base URL. The base element provides a base address for interpreting relative URLs when the document is read out of context.

For example, FIG. 9 shows text with a document URL 200, a base element 202, a hypertext link with an absolute URL 204, and a hypertext link with a relative URL 206, which is evaluated with respect to base URL 202 to produce a resulting URL 208. As an additional example, FIG. 10 shows text with a document URL 210, no base element, a hypertext link with an absolute URL 212, and a hypertext link with a relative URL 214, which is evaluated with respect to document URL 210 to produce a resulting URL 216.

A site at which documents are made available to network users through a web server is called a Web site. A web server is a computer program that allows a computer on the network to make documents available to the rest of the WWW or to other computers on a private network. The documents are often hypertext documents in the HTML language, but may be other types of document objects as well, and may include images, audio, and/or video information. The information that is managed by the web server includes hypertext documents that are stored on the server (or on other computers) or are dynamically generated by scripts on the web server. Web servers have been implemented for several different computer platforms, including Sun Corporation's SPARC II workstation running the UNIX operating system, and personal computers with Intel Corporation's PENTIUM processor running Microsoft Corporation's MS-DOS operating system and/or the WINDOWS graphic operating environment.

A web server program typically maps document object names that are known to the client to file names on the server file system. This mapping may be arbitrarily complex, and any author or program that tries to access documents on the web server directly would need to understand this name mapping. A user (typically using a computer other than that used to execute the web server program) who wishes to access documents available on the network at a Web site runs a web browser. The combination of the web server and web browser communicating using an HTTP protocol over a computer network is referred to as a web architecture. The web browser program allows the user to retrieve and display documents from web servers. Some of the popular web browser programs are: NAVIGATOR browser from the Netscape Communications Corporation, of Mountain View, Calif.; MOSAIC browser from the National Center for Supercomputing Applications (NCSA); WINweb browser, from Microelectronics And Computer Technology Corporation of Austin, Tex.; and INTERNET EXPLORER from Microsoft Corporation of Redmond, Wash. Web browsers have been developed to run on different platforms, including personal computers with the Intel Corporation's PENTIUM processor running Microsoft Corporation's WINDOWS graphics environment, and Apple Corporation's MACINTOSH personal computers.

The web server and the web browser typically communicate using the Hypertext Transfer Protocol (HTTP) message protocol and the underlying transmission control protocol/Internet protocol (TCP/IP) data transport protocol of the Internet. HTTP is described in *Hypertext Transfer Protocol—HTTP/1.0*, by T. Berners-Lee, R. T. Fielding, H. Frystyk Nielsen, Internet Draft Document, Oct. 14, 1995, and is currently in the standardization process. In HTTP, the web browser establishes a connection to a web server and sends an HTTP request message to the server. In response to an HTTP request message, the web server checks for authorization, performs any requested action, and returns an HTTP response message containing an HTML document in accord with the requested action, or an error message. The returned HTML document may simply be a file stored on the web server, or may be created dynamically using a script called in response to the HTTP request message. For instance, to retrieve a document, a web browser may send an HTTP request message to the indicated web server, requesting a document by reference to the URL of the document. The web server then retrieves the document and returns it in an HTTP response message to the web browser. If the document has hypertext links, then the user may again select one of the links to request that a new document or object be retrieved and displayed.

Request messages in HTTP contain a "method name" indicating the type of action to be performed by the server, a URL indicating a target object (e.g., a document or script) on the web server, and other control information. Response messages contain a status line, server information, and possible data content.

Historically, Web pages have been primarily text based and images having a relatively large size were infrequently included in the pages. Also, the relatively high cost of a fast connection to a network, such as provided by a T-1 line and a router, has caused many users to employ relatively slow network connections for viewing Web pages. Until recently, most users employing relatively slow network connections, such as a modem over a Plain Old Telephone Service (POTS) line, have been able to download and view most Web pages within a reasonable period of time (less than a minute). However, an increasing number of Web pages include at least one image. Since images are a popular medium of expression in Web pages, the relatively large size of images as compared to text has resulted in an increase in the average download time for users that employ relatively slow network connections. Thus, a need has arisen for a solution that enables the user employing a relatively slow network connection to download primarily image-based Web pages within a reasonable period of time.

One solution to shortening the download time of a large Web page has been to reduce the amount of data employed to display each image in the page. It is well known in the art that the amount of data comprising an image is directly proportional to the number of pixels in the displayed image and the number of colors employed to render the image. Any reduction in the size of an image included in a Web page tends to cause a corresponding decrease in the amount of data that must be downloaded by the user for viewing the image. A thumbnail image created from an original (full size) image typically conveys sufficient information so that a person viewing the thumbnail image is aware of the content of the original image. Thus, Web pages that display thumbnail images instead of full size images download more quickly and still communicate the intended expression to the user.

As noted above, if a user is creating or editing an existing Web page and wants to insert a thumbnail image to represent a larger image, it is necessary to first produce the thumbnail image, insert the thumbnail image into the Web page, and then manually associate a hyperlink back to the original larger image from the thumbnail image so that when the thumbnail image is selected by someone viewing the Web page, the full size original image will be retrieved and displayed. Clearly, it would be desirable to automatically produce a thumbnail image in a Web page from an original image, which is either previously disposed in an existing Web page or is intended for positioning in a new/existing Web page. Also, a hyperlink to the original image should automatically be created and associated with the thumbnail image in the Web page, so that when the user selects the thumbnail image, the hyperlink is activated and the original image is displayed.

SUMMARY OF THE INVENTION

In accord with the present invention a method is defined for enabling a user to automatically introduce a thumbnail image into a Web page to represent an original image. The thumbnail image has a size that is substantially smaller than the original image. Initially, the user selects an original image that is to be represented by a thumbnail image. The thumbnail image is produced based upon the original image and is placed into a Web page in place of the original image. A link to the original image is automatically provided and associated with the thumbnail image in the Web page. The user is enabled to save the Web page, the thumbnail image, and the link. The Web page has a tag for the thumbnail image so that the thumbnail image will appear when the Web page is displayed. Also, the saved link enables the original image to be retrieved and displayed if the thumbnail image is selected, causing the link to be activated.

Preferably, the thumbnail image is only produced if the original image is greater than a predetermined size. Further, if the original image is not in a desired format, the present invention will preferably convert the original image to the desired format. A pointing device may be employed to select the thumbnail image in the Web page and activate the link. In one form of the invention, the link is a hyperlink disposed in an HTML document associated with the Web page. The user is enabled to determine the size of the thumbnail image, e.g., by selecting the dimension of the length or height, or alternatively, to select a size reduction ratio that is employed to produce the thumbnail image from the original image.

In one embodiment, the method includes the steps of enabling the user to selectively include a beveled edge and/or selectively including a border around the periphery of the thumbnail image. The color and pattern of the border may optionally be selected by the user. When producing the thumbnail image, the original image may be in an existing Web page, or disposed in another location. If the original image is in an existing Web page, the thumbnail image may be positioned in the existing Web page to replace the original image. The position of the thumbnail image in the Web page is also preferably selectable by the user.

Other aspects of the present invention are directed to a system for producing a thumbnail sized view of an original image that is disposed in a Web page, and a computer-readable medium having computer-executable instructions for performing logical steps that enable a user to automatically introduce a thumbnail image into a Web page to represent an original image. In both cases, the invention is defined in a manner generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 9 is a sample HTML document with a base URL, and illustrating a hyperlink using a relative URL and a hyperlink using an absolute URL;

FIG. 10 is a sample HTML document without a base URL, and illustrating a hyperlink using a relative URL and a hyperlink using an absolute URL;

FIG. 11A is a sample HTML document with a tag associated with the exemplary original image;

FIG. 11B is a sample HTML document with a tag associated with the exemplary thumbnail image; and FIG. 11C is a sample HTML document illustrating the tag associated with the exemplary original image, the tag associated with the exemplary thumbnail image, and a hyperlink from the thumbnail image to the original image.

DESCRIPTION OF THE PREFERRED EMBODIMENT

The present invention enables a user to automatically produce a thumbnail (sized) image in a new or existing Web page to represent an original image selected in the existing Web page or from a directory in which the original image is stored. When the thumbnail image is inserted into the Web page, the invention automatically provides a hyperlink that connects the thumbnail image to the original image. Thus, the present invention obviates the need for the user to manually produce the thumbnail image and to enter the HTML code necessary to provide the hyperlink in the Web page, from the thumbnail image to the original image.

Exemplary Operating Environment

Figure 1:
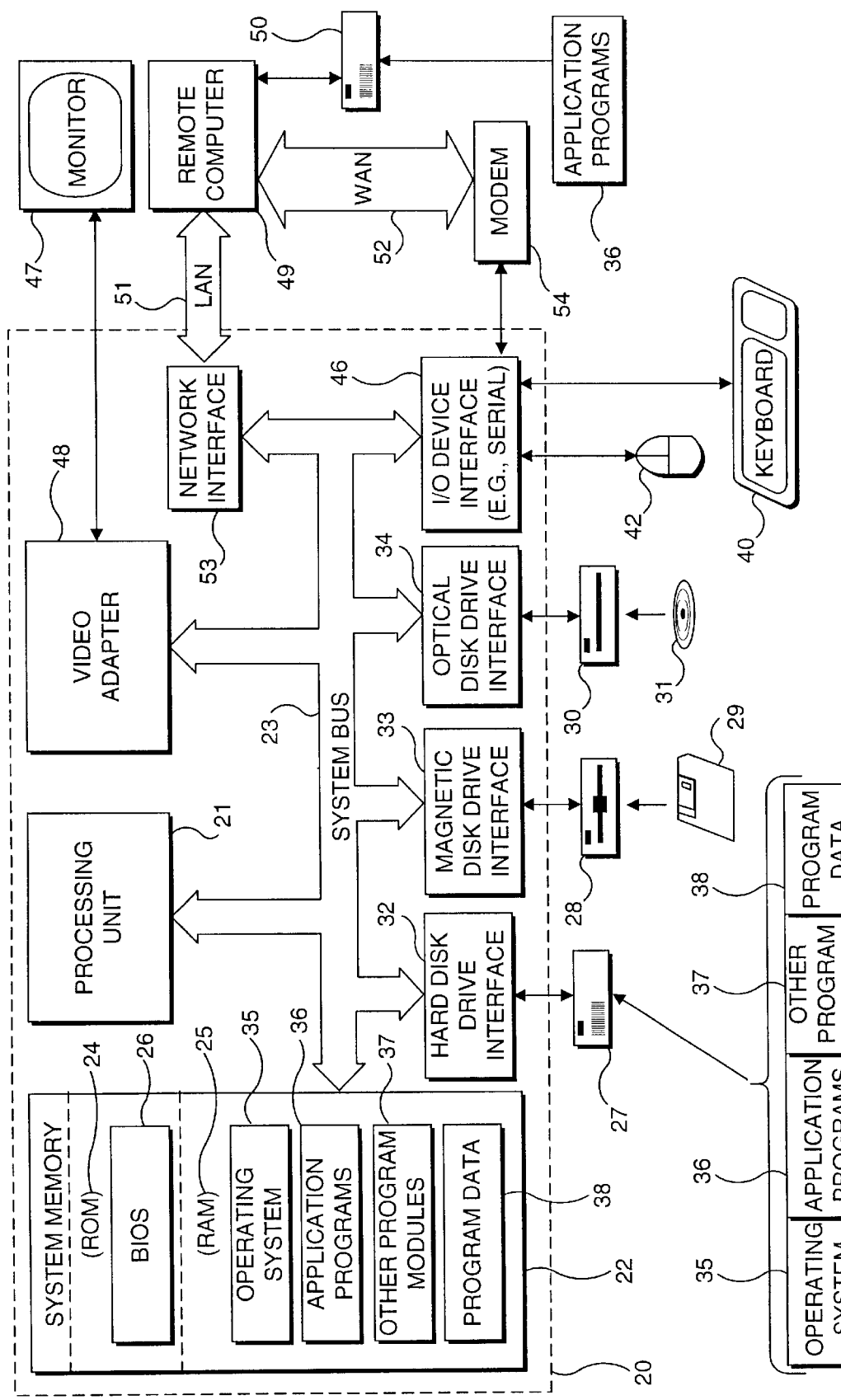
FIG. 1 is an exemplary block diagram of a typical personal computer suitable for implementing the present invention.

FIG. 1 and the following discussion are intended to provide a brief, general description of a suitable computing environment in which the present invention may be implemented by executing machine instructions, such as program modules, on a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronic devices, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to processing unit 21. System bus 23 may be any of several types of bus structures including a memory bus or memory controller, a peripheral bus, and a local bus using any of a variety of bus architectures. The system memory includes a read only memory (ROM) 24 and a random access memory (RAM) 25. A basic input/output system (BIOS) 26, containing the basic routines that helps to transfer information between elements within personal computer 20, such as during start-up, is stored in ROM 24. Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer readable instructions, data structures, program modules, and other data for personal computer 20. Although the exemplary environment described herein employs a hard disk, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, or a universal serial bus (USB). A monitor 47 or other type of display device is also connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, personal computer 20 is connected to local network 51 through a network interface or adapter 53. When used in a WAN networking environment, personal computer 20 typically includes a modem 54 or other means for establishing communications over WAN 52, and over the Internet. Modem 54, which may be internal or external, is connected to system bus 23 via serial port interface 46. In a networked environment, program modules depicted relative to personal computer 20, or portions thereof, may be stored in the remote memory storage device. It will be appreciated that the network connections shown are exemplary and other means of establishing a communications link between the computers may be used.

Figure 2:
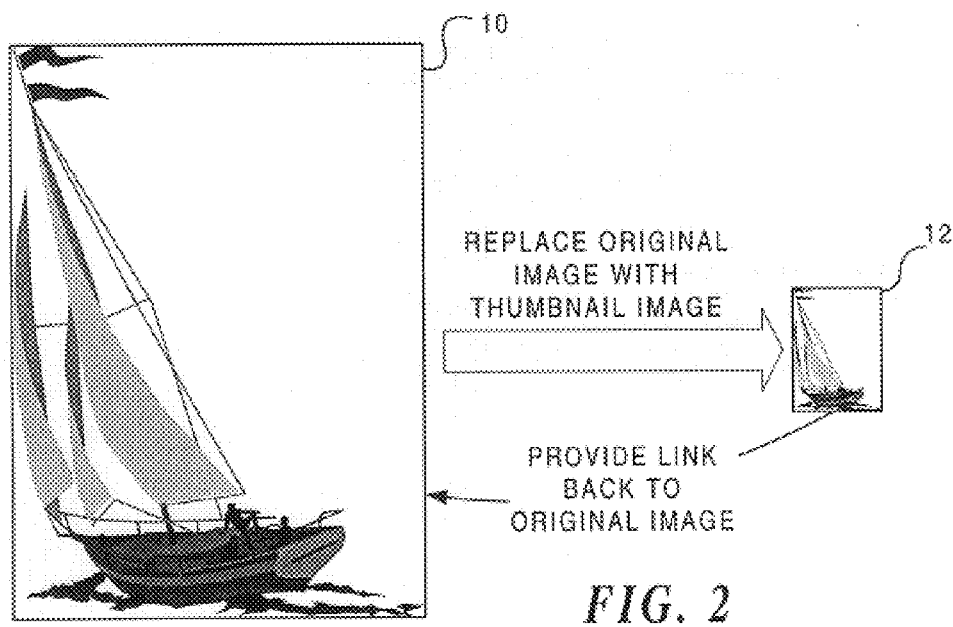
FIG. 2 is a schematic diagram showing an exemplary original image and a thumbnail-sized reproduction of the original image, illustrating the functionality of the present invention.

FIG. 2 illustrates the functionality of reproducing a thumbnail (small size) image 12 from an original (full size) image 10 so that the original image is represented by the thumbnail image and has associated with it a link to the original image. The selection of thumbnail image 12 in a Web page causes the associated link to be traversed and original image 10 to be retrieved and displayed. One embodiment of the present invention is being prepared for inclusion in Microsoft Corporation's FRONTPAGE98 Web authoring and management tool and will be selectable as a menu item entitled "Auto Thumbnail" in a Web page editing and authoring module provided in that program. Typically, the user will select this menu item after first selecting a full size image, either one that is present in an existing Web page that is being created or edited, or a full size image stored in a directory on the hard drive of the server on which the Web page will be accessed. However, it should be noted that the original image can be stored on other computers accessible from the server on which the Web page will be accessed. It should be noted that the present invention is not limited to inclusion in a Web page editor, but instead, could be included with other application programs or provided as a stand alone program, or provided as a plug-in tool for use with any editor.

Figure 3:
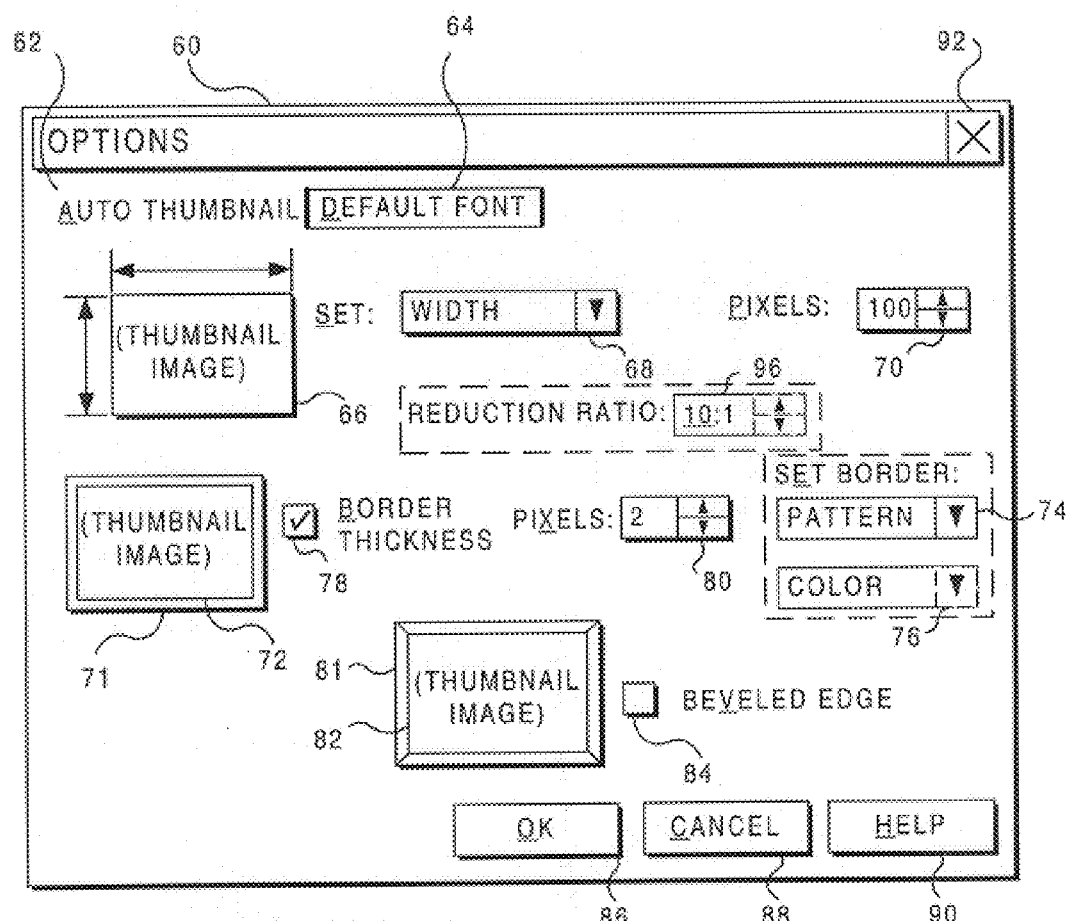
FIG. 3 is an exemplary dialog box that is provided to enable a user to select options when automatically providing a thumbnail image to represent an original image in a Web page.

Turning now to FIG. 3, a dialog box 60 that is opened when the user selects the Auto Thumbnail menu item is shown. An auto thumbnail tab 62 has been selected, causing the display of a plurality of options that may be selected by a user for controlling various parameters of the thumbnail image, e.g., thumbnail image 12, that the user wants to provide in the Web page to represent the original image just selected by the user. A scaleable image 66 is illustrated in dialog box 60 and has dimensions corresponding to the dimensions of the thumbnail image that will be created in the Web page. The user selects a dimension (i.e., height or width) of scaleable image 66 to be specified with a drop-down menu 68. Next, the user employs a spinner control 70 to select the number of pixels for the dimensional parameter selected in drop-down menu 68. In this example, the width of scaleable image 66 has been selected and the user has chosen the size of the width to be 100 pixels. The display of scaleable image 66 is dynamically linked to drop-down menu 68 and spinner control 70 so that the dimensions for the displayed scaleable image will immediately reflect the selections made the user. Although not shown, the user may similarly use drop-down menu 68 to select the height dimension of scaleable image 66. The user would then employ spinner control 70 to set the size of the selected height dimension to an exact number of pixels for scaleable image 66. The aspect ratio (ratio of height to width) of the original image is maintained in the thumbnail image. Thus, if the width of the original image is ½ the height, selecting a width of 100 pixels for the thumbnail image will automatically cause the height of the thumbnail image to be 200 pixels. It is also contemplated that the size of the thumbnail image might be specified as a reduction ratio. Thus, a spinner control 96 is depicted as an alternative (in a dash line box) that enables the user to select the reduction ratio for the thumbnail image relative to the original image. In the example shown, spinner control 96 has been set to produce a thumbnail image that is ⅒ the size of the original image, i.e., a reduction factor of 10:1.

Auto thumbnail tab 62 also includes a preview of a border image 72, which illustrates how the thumbnail image will appear with a border 71 disposed around its periphery. A checkbox 78 is employed by the user to selectively include the border 71 and a spinner control 80 enables the user to adjust the border's thickness to a selected number of pixels. If checkbox 78 is not selected, a border will not be provided. Also, as indicated by enclosing the options in a dash box, it is contemplated that the present invention might optionally enable the user to select a color and/or a pattern for border 71. A drop-down box 74 may then be employed by the user to select a particular pattern, and a drop-down box 76 may be used to select a particular color for border 71. The display of border image 72 is dynamically linked to the drop-down menus 74 and 76, checkbox 78, and spinner control 70 so that the dimensions/coloring/pattern selected by the user for border 71 will immediately reflect the selections made by the user.

Further, auto thumbnail tab 62 enables the user to preview a beveled edge image 82, which shows the thumbnail image with a beveled edge 81 around its periphery. A checkbox 84 is employed by the user to selectively employ the beveled edge effect, and if not checked, a beveled edge will not be provided. The display of beveled edge image 82 is dynamically linked to checkbox 84 so that the selection of the beveled edge will immediately be reflected in the displayed image. Normally, a user would not select both checkbox 78 and checkbox 84, but it is possible to do so in this preferred embodiment.

The user of the present invention may cancel all selected options with a cancel push button 88 or accept all of the selections with an OK push button 86. On-line help is accessed by the selection of a help push button 90, and the user may close option interface dialog box 60 with a close push button 92. Although details are not shown in FIG. 3, a default font tab 64 may be selected by the user for determining the type of font that will be employed for text associated with the display of thumbnail image 12.

Figure 4:
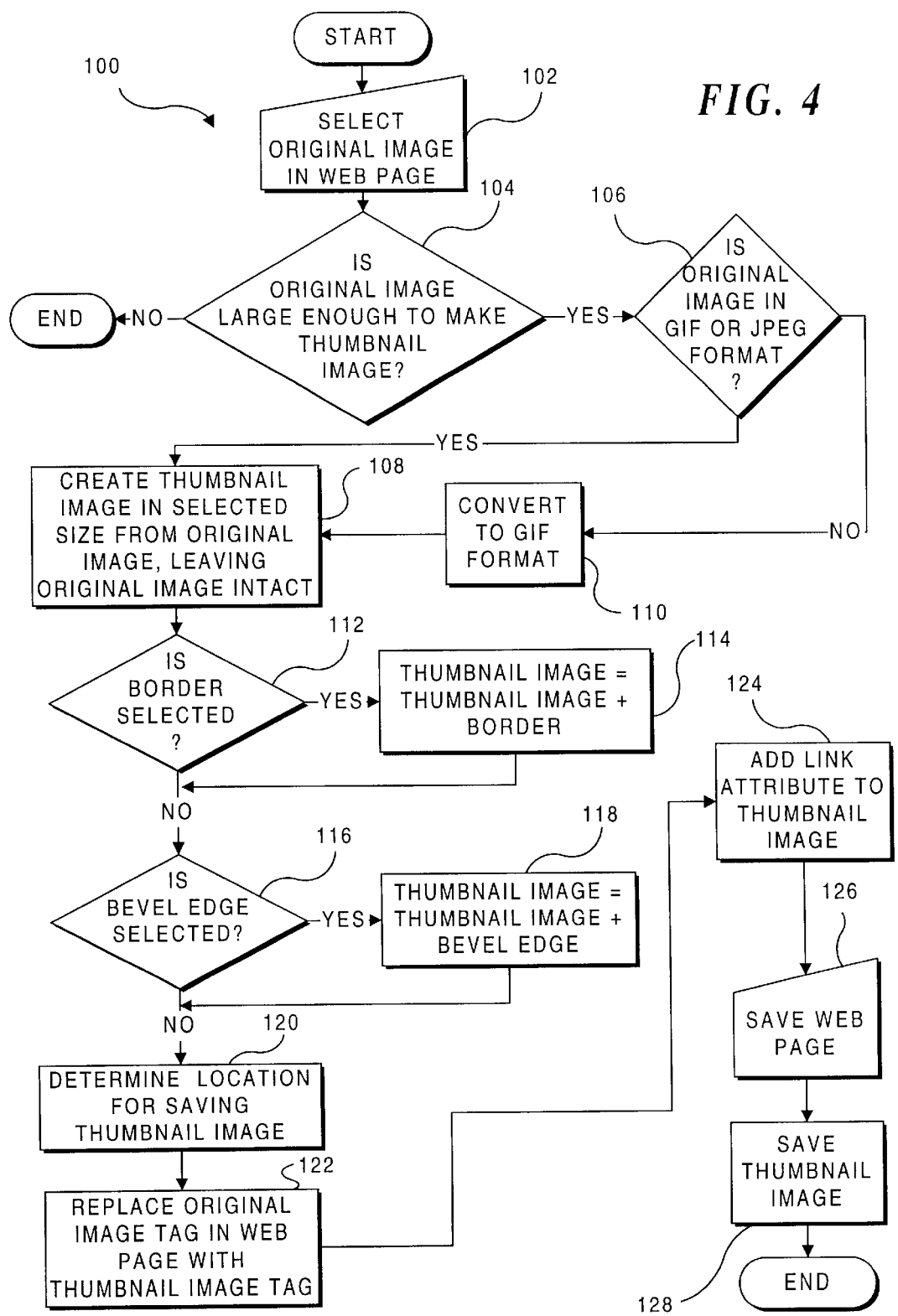
FIG. 4 is a flow chart that illustrates the logical steps implemented by software instructions in producing a thumbnail image to represent an original image, in accord with the present invention.

Referring now to FIG. 4, a flow chart 100 is shown that illustrates the logical steps implemented by the present invention, to represent an original image in a Web page with a corresponding thumbnail image. Moving from a start block to an input block 102, the logic waits for the user to select the original image that will be used in producing the thumbnail image, e.g., original image 10. After the selection, the logic advances to a decision block 104 for determining whether the original image is sufficiently large to produce thumbnail image 12. In this step, the dimensions of the original image are compared to a predetermined set of dimensions that represent a minimum size for producing a thumbnail image. If the determination at decision block 104 is false, the logic moves to an end block and does not produce the thumbnail image. However, if the determination is true, the logic moves to another decision block 106 in which the format of the original image is checked. In a preferred embodiment, if the format of the original image is not in the Graphics Interchange Format (GIF) or Joint Photographers Expert Group (JPEG) format, the logic moves to a block 110. However, it is contemplated that many other image formats would be acceptable for use in producing a thumbnail image. In this embodiment, the format of the original image is converted any different format to the GIF format and the logic steps to a block 108. However, if the format of the original image has been determined at decision block 106 to be the GIF or JPEG format, the logic proceeds directly to block 108.

At block 108, the thumbnail image is created in a user-selected size from the original image. Significantly, the original image is not altered by the creation of the thumbnail image. The logic moves to a decision block 112 to determine whether a border effect has been selected by the user for use with the thumbnail image. If true, the logic moves to a block 114 and the selected border is added to the display of the thumbnail image. Although a default color/pattern is for example, blue with no pattern, another color and/or pattern may optionally be selected by the user and applied to the border. The logic advances to a decision block 116 and determines if a beveled edge effect has been selected by the user. Also, the logic reaches decision block 116 if the determination at decision block 112 had been false. If the beveled edge effect has been selected, the logic moves to a block 118, and the effect is added to the thumbnail image. (The logical steps associated with block 118 are presented in greater detail in FIG. 5, as discussed below.) In a block 120, following block 118 or after a false determination in decision block 116, the location for saving the thumbnail image is determined. Typically, the location determined at block 120 will be associated with the HTML document for a Web page in which the thumbnail image is to be displayed.

Figure 6:
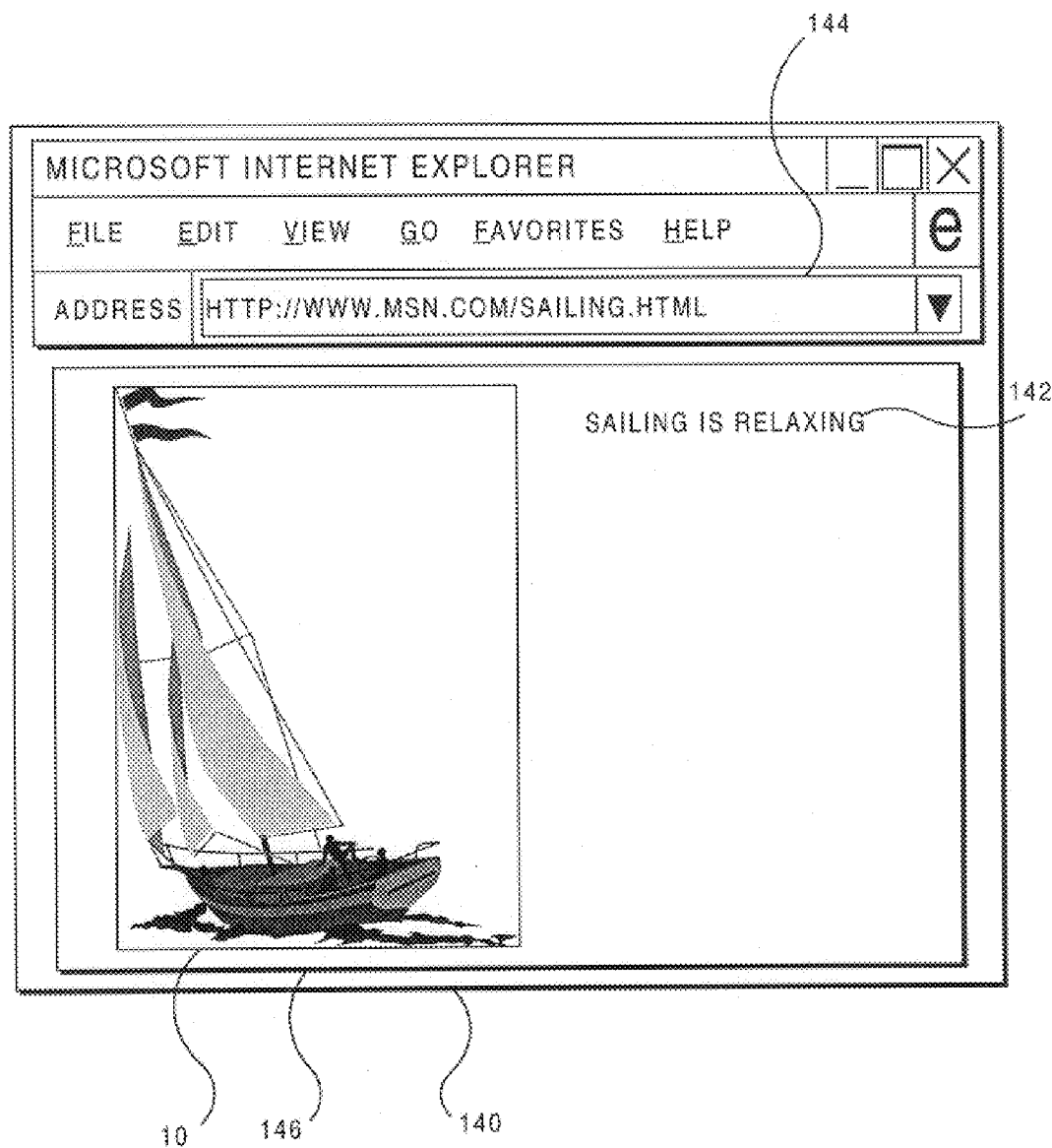
FIG. 6 is a browser view of a Web page that includes the exemplary original (full size) image and text.
Figure 7:
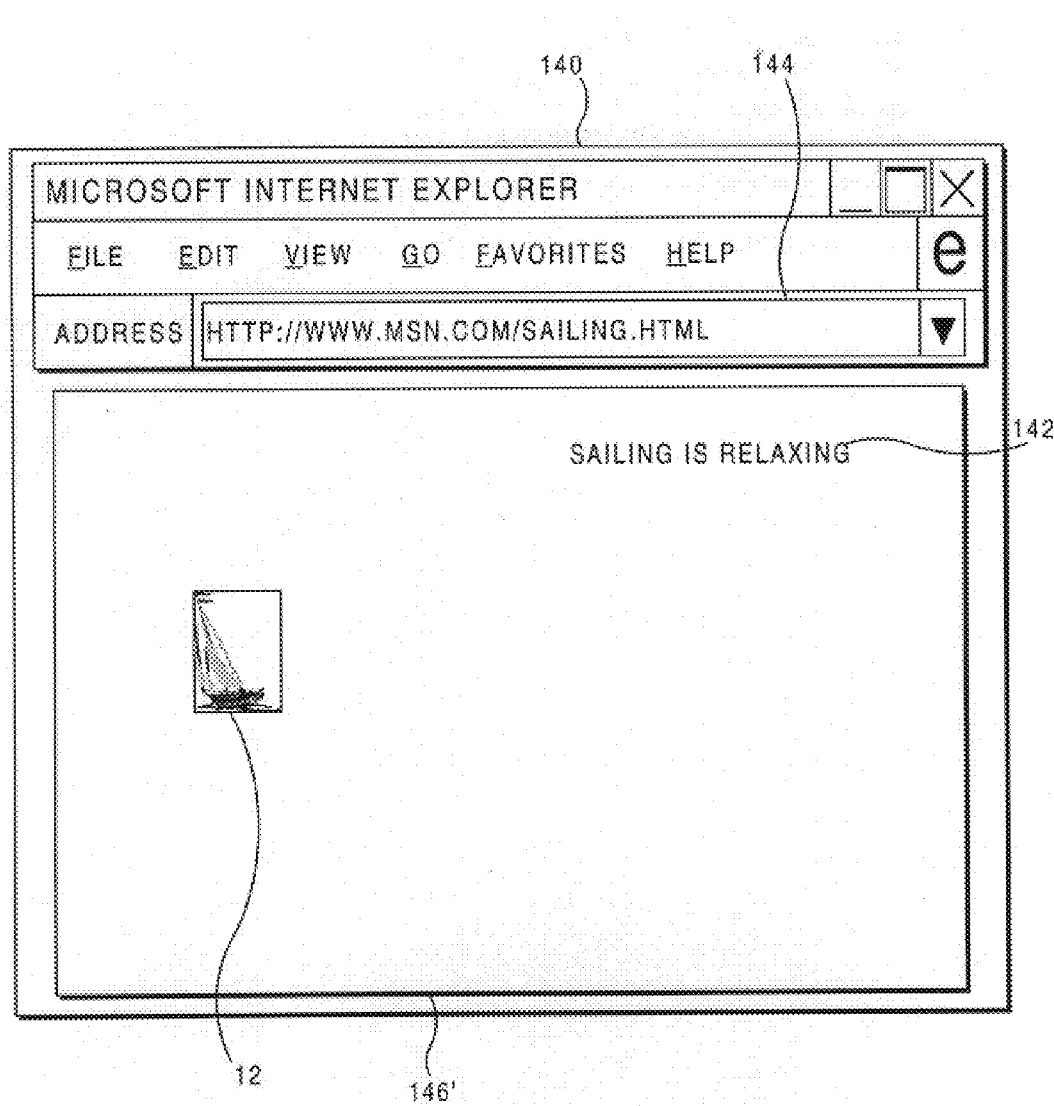
FIG. 7 is a browser view of a modified Web page that includes the exemplary thumbnail (reduced size) image corresponding to the original image of FIG. 6.

After the logic has determined the location for saving the thumbnail image, the logic moves to a block 122, and a tag associated with original image 10 is replaced with another tag that is associated with the thumbnail image. The tags are disposed in an HTML document that is associated with the Web page. For example, FIG. 11A shows the text in an HTML document 228 that includes a document URL address 218, a text string 222, and a tag 220 that is associated with original image 10. A web browser that evaluates HTML document 228 will produce a Web page 146 as shown in FIG. 6. As an additional example, FIG. 11B shows an HTML document 230 that includes document URL address 218, text string 222, and a tag 224 that is associated with thumbnail image 12. When a web browser evaluates HTML document 230, a Web page 146', as depicted in FIG. 7, will be displayed.

Figure 8:
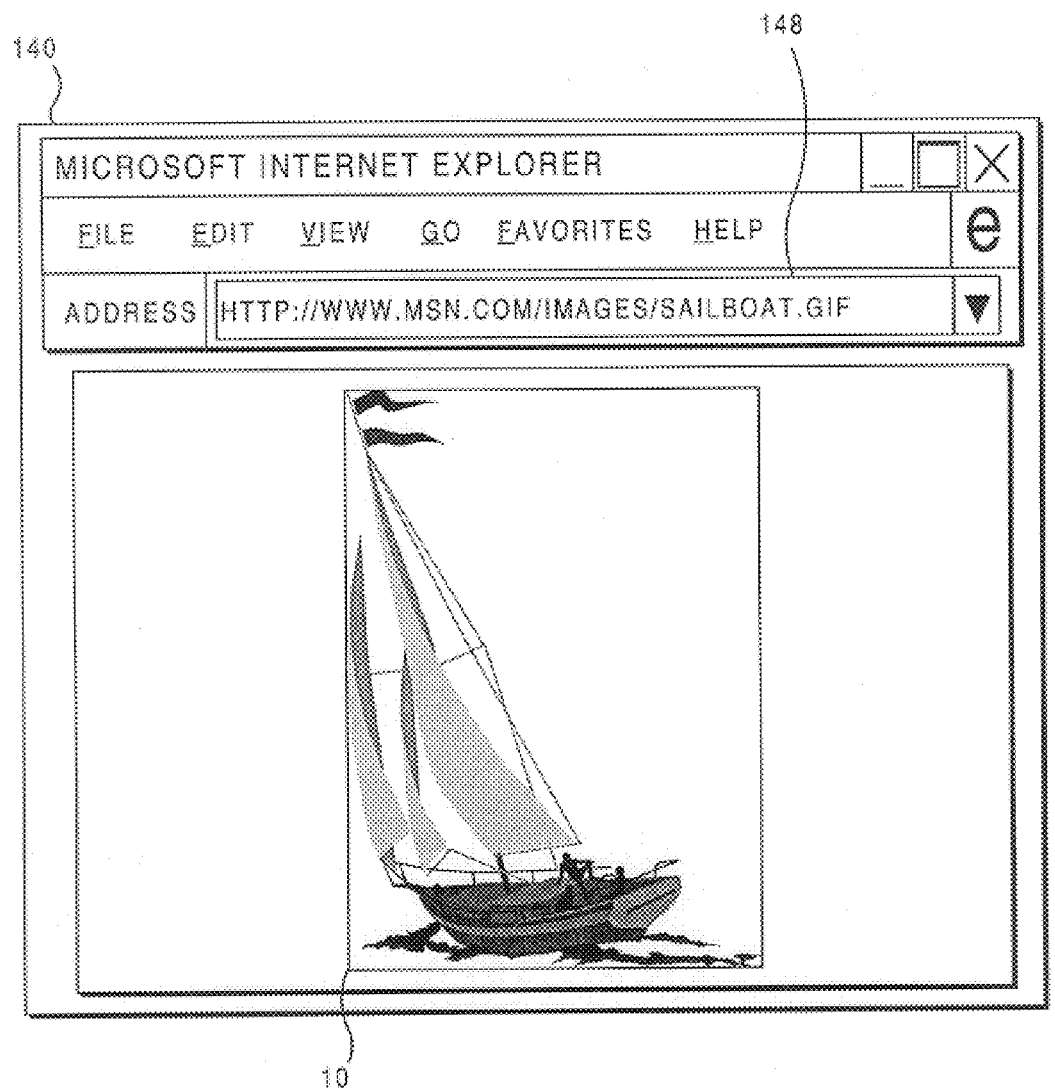
FIG. 8 is a browser view of a Web page that includes the original image displayed when the thumbnail image that is disposed in the modified Web page is selected and its associated hyperlink is activated.

In a block 124, a link attribute is automatically added to (associated with) the thumbnail image. Whenever the user selects the thumbnail image in the Web page, the selection will cause the web browser to activate the link attribute and replace the display of the Web page and the thumbnail image with original image 10. For example, FIG. 11C show an HTML document 232 that includes URL address 218, text string 222, tag 224, and a link 226 that is associated with original image 10. The link employs an absolute URL address for identifying the location of original image 10 (SAILBOAT.GIF). When the user has selected thumbnail image 12 in Web page 146' as depicted in FIG. 7, the web browser will activate the link attribute and display original image 10, as shown in FIG. 8.

Referring back to FIG. 4, the logic next steps to an input block 126 to await a command from the user to save the Web page, e.g., the user may employ a Web editor menu command (or control button) to save the HTML document for the Web page, and thus, the Web page. After the Web page is saved at input block 126, the logic moves to a block 128 and the thumbnail image is saved at the location previously determined by the user. Finally, the logic steps to an end block and the logic flow is complete.

Figure 5:
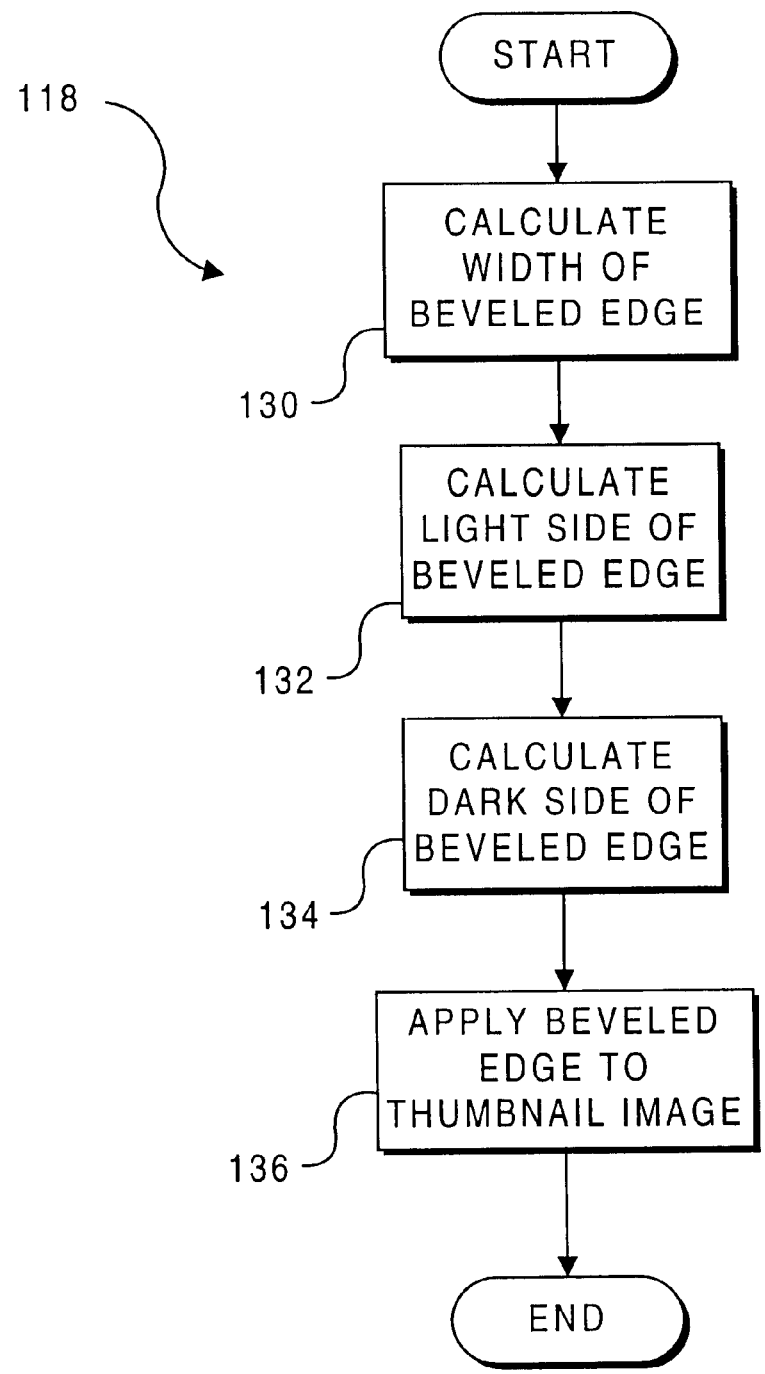
FIG. 5 is a flow chart that shows the logical steps implemented by the software instructions in producing a beveled edge for the thumbnail image.

In FIG. 5, a flow chart illustrates the logical steps implemented in regard to block 118 to produce beveled edge 71 around the periphery of a thumbnail image. Moving from a start block to a block 130, the width of the beveled edge is set to 1/16 of the length of the shortest dimension of the thumbnail image. The shortest dimension may be either the height or width of the thumbnail image.

Next, the logic moves to a block 132, and a light color for the upper left side of beveled edge is determined. The light color is created by individually multiplying the red, green, and blue pixel values of the thumbnail image by a scalar value (e.g., 1.75). Further, the value thus determined for each red, green, and blue pixel is clamped at a maximum value of 255. After determining the light side color, the logic steps to a block 134 in which a dark color for the lower right side of the beveled edge is determined. The dark color is created by dividing the individual red, green, and blue pixel values for the thumbnail image by another scalar value (e.g., 2). Once the color for the dark side is determined, the logic moves to a block 136 and the calculated color and width parameters are employed to produce the beveled edge around the periphery of the thumbnail image. The logic advances to an end block and the logic returns to the main flow chart shown in FIG. 4.

In FIG. 6, a browser 140 is shown displaying Web page 146. In this view, Microsoft Corporation's INTERNET EXPLORER is employed as browser 140, which includes original image 10 and a text string 142. Also, browser 140 indicates a URL address 144 that identifies the absolute location of Web page 146.

In FIG. 7, browser 140 is shown displaying Web page 146' at URL address 144 after the present invention has produced thumbnail image 12 and it has been positioned in the Web page as desired by the user. Web page 146' is substantially similar to Web page 140 except that original image 10 has been replaced by thumbnail image 12. Significantly, URL address 144 is also employed to display Web page 146', even though the original image has been replaced.

Turning now to FIG. 8, browser 140 is shown displaying original image 10, disposed at another URL address 148. This display is presented in response to the user selecting thumbnail image 12 in Web page 146' and thereby activating its hyperlink. The selection causes link 226 to be activated so that browser 140 retrieves and displays original image 10, from URL address 148.

Additionally, the user can intuitively determine the disposition of thumbnail image 10 in Web page 146 without requiring the user to be manually modify HTML code. Once the user employs pointing device 42 to "drag and drop" thumbnail image 12 in a location within Web page 146, the present invention will automatically provide all necessary updates to the HTML code in the HTML document associated with Web page 146 so that thumbnail image 12 will be disposed at the selected location in the Web page.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling a user to automatically introduce a thumbnail image into a Web page to represent an original image, said thumbnail image having a size that is substantially smaller than the original image, comprising the steps of:
   (a) enabling the user to select the original image that is to be represented by the thumbnail image;
   (b) producing the thumbnail image from the selected original image;
   (c) placing the thumbnail image into the Web page to represent said original image;
   (d) automatically providing in the Web page a hyperlink from the thumbnail image to the original image; and (e) enabling the user to save the Web page, the thumbnail image, and the hyperlink, said Web page including a markup tag associated with the thumbnail image so that the thumbnail image appears in the Web page when the Web page is displayed, said hyperlink enabling the original image to be retrieved and displayed if the thumbnail image is then selected in the displayed Web page and the hyperlink is activated.

2. The method of claim 1, wherein the step of producing the thumbnail image is only enabled if the original image is greater than a predetermined size.

3. The method of claim 1, further comprising the steps of:
(a) determining if the original image is in a desired graphics format; and
(b) if the original image is not in the desired graphics format, converting the original image to the desired graphics format.

4. The method of claim 1, wherein selecting the thumbnail image in the Web page and activating the hyperlink is enabled with a pointing device.

5. The method of claim 1, wherein activating said hyperlink causes the original image to be retrieved and displayed in place of the Web page and the thumbnail image.

6. The method of claim 1, further comprising the step of enabling the user to select the size of the thumbnail image.

7. The method of claim 1, further comprising the step of selecting a size reduction ratio, said size reduction ratio being employed to determine the size of the thumbnail image relative to the original image.

8. The method of claim 1, further comprising the step of enabling the user to selectively include a beveled edge around the thumbnail image.

9. The method of claim 1, further comprising the step of enabling the user to selectively include a border around the thumbnail image.

10. The method of claim 9, further comprising the step of enabling the user to determine a color of the border.

11. The method of claim 9, further comprising the step of enabling the user to determine a pattern for the border.

12. The method of claim 1, wherein the tag comprises an HTML tag, further comprising the step of automatically entering the HTML tag for the thumbnail image in an HTML document associated with the Web page.

13. The method of claim 12, further comprising the step of disposing another HTML tag associated with the original image in the HTML document, said HTML tag and said other HTML tag being employed to link the thumbnail image to the original image.

14. The method of claim 1, wherein the original image selected by the user is already disposed in an existing Web page.

15. The method of claim 14, wherein the Web page in which the thumbnail image is placed is the existing Web page.

16. The method of claim 15, wherein the thumbnail image replaces the original image selected by the user in the existing Web page.

17. The method of claim 1, further comprising the step of enabling the user to determine a position of the thumbnail image in the Web page.

18. A computer-readable medium having computer-executable instructions for performing logical steps that enable a user to automatically introduce a thumbnail image into a Web page to represent an original image, said thumbnail image having a size that is substantially smaller than the original image, said logical steps comprising:
(a) enabling the user to select the original image that is to be represented by the thumbnail image;
(b) producing the thumbnail image from the selected original image;
(c) placing the thumbnail image into the Web page to represent said original image;
(d) automatically providing in the Web page a hyperlink from the thumbnail image to the original image; and
(e) enabling the user to save the Web page, the thumbnail image, and the hyperlink, said Web page including a markup tag associated with the thumbnail image so that the thumbnail image appears in the Web page when the Web page is displayed, said hyperlink enabling the original image to be retrieved and displayed if the thumbnail image is then selected in the displayed Web page and the hyperlink is activated.

19. The computer-readable medium of claim 18, wherein the logical step of producing the thumbnail image is only enabled if the original image is greater than a predetermined size.

20. The computer-readable medium of claim 18, further comprising the logical steps of:
(a) determining if the original image is in a desired graphics format; and
(b) if the original image is not in the desired graphics format, converting the original image to the desired graphics format.

21. The computer-readable medium of claim 18, wherein selecting the thumbnail image in the Web page and activating the hyperlink is enabled with a pointing device.

22. The computer-readable medium of claim 18, wherein activating said hyperlink causes the original image to be retrieved and displayed in place of the Web page and the thumbnail image.

23. The computer-readable medium of claim 18, further comprising the logical step of enabling the user to select the size of the thumbnail image.

24. The computer-readable medium of claim 18, further comprising the logical step of selecting a size reduction ratio, said size reduction ratio being employed to determine the size of the thumbnail image relative to the original image.

25. The computer-readable medium of claim 18, further comprising the logical step of enabling the user to selectively include a beveled edge around the thumbnail image.

26. The computer-readable medium of claim 18, further comprising the logical step of enabling the user to selectively include a border around the thumbnail image.

27. The computer-readable medium of claim 26, further comprising the logical step of enabling the user to determine a color of the border.

28. The computer-readable medium of claim 26, further comprising the logical step of enabling the user to determine a pattern for the border.

29. The computer-readable medium of claim 18, wherein the tag comprises an HTML tag, further comprising the logical step of automatically entering the HTML tag for the thumbnail image in an HTML document associated with the Web page.

30. The computer-readable medium of claim 29, further comprising the logical step of disposing another HTML tag associated with the original image in the HTML document, said HTML tag and said other HTML tag being employed to link the thumbnail image to the original image.

31. The computer-readable medium of claim 18, wherein the original image selected by the user is already disposed in an existing Web page.

32. The computer-readable medium of claim 31, wherein the Web page in which the thumbnail image is placed is the existing Web page.

33. The computer-readable medium of claim 32, wherein the thumbnail image replaces the original image selected by the user in the existing Web page.

34. The computer-readable medium of claim 18, further comprising the step of enabling the user to determine a position of the thumbnail image in the Web page.

35. A system for producing a thumbnail image representing an original image and having a size that is less than the original image, comprising:

(a) a memory for storing a plurality of machine instructions that define a software program;

(b) a display that is coupled to the processor, for displaying text and images;

(c) an operator interface that enables a user to provide input to the processor; and (d) a processor for executing the plurality of machine instructions, causing functions to be implemented, said functions including:

(i) enabling a user to employ the operator interface to select the original image that is to be represented by the thumbnail image;

(ii) producing the thumbnail image from the selected original image;

(iii) placing the thumbnail image into the Web page to represent said original image;

(iv) automatically providing in the Web page a hyperlink from the thumbnail image to the original image; and (v) enabling the user to save the Web page, the thumbnail image, and the hyperlink, said Web page including a markup tag associated with the thumbnail image so that the thumbnail image appears in the Web page when the Web page is displayed on the display, said hyperlink enabling the original image to be retrieved and displayed on the display if the thumbnail image is then selected in the displayed Web page and the hyperlink is activated.

36. The system of claim 35, wherein the function of producing the thumbnail image is only enabled if the original image is greater than a predetermined size.

37. The system of claim 35, wherein the machine instructions further cause the processor to implement the functions of:

(a) determining if the original image is in a desired graphics format; and (b) if the original image is not in the desired graphics format, converting the original image to the desired graphics format.

38. The system of claim 35, wherein selecting the thumbnail image in the Web page and activating the hyperlink is enabled with the operating interface.

39. The system of claim 35, wherein activating said hyperlink causes the original image to be retrieved and displayed on the display in place of the Web page and the thumbnail image.

40. The system of claim 35, wherein the machine instructions further cause the processor to implement the function of: enabling the user to select the size of the thumbnail image.

41. The system of claim 35, wherein the machine instructions further cause the processor to implement the function of: selecting a size reduction ratio, said size reduction ratio being employed to determine the size of the thumbnail image relative to the original image.

42. The system of claim 35, wherein the machine instructions further cause the processor to implement the function of enabling the user to selectively include a beveled edge around the thumbnail image.

43. The system of claim 35, wherein the machine instructions further cause the processor to implement the function of enabling the user to selectively include a border around the thumbnail image.

44. The system of claim 43, wherein the machine instructions further cause the processor to implement the function of enabling the user to determine a color of the border.

45. The system of claim 43, wherein the machine instructions further cause the processor to implement the function of enabling the user to determine a pattern for the border.

46. The system of claim 35, wherein the tag comprises an HTML tag, and wherein the machine instructions further cause the processor to implement the function of automatically entering the HTML tag for the thumbnail image in an HTML document associated with the Web page.

47. The system of claim 46, wherein the machine instructions further cause the processor to implement the function of disposing another HTML tag associated with the original image in the HTML document, said HTML tag and said other HTML tag being employed to link the thumbnail image to the original image.

48. The system of claim 35, wherein the original image selected by the user is already disposed in an existing Web page.

49. The system of claim 48, wherein the Web page in which the thumbnail image is placed is the existing Web page.

50. The system of claim 49, wherein the thumbnail image replaces the original image selected by the user in the existing Web page.

51. The system of claim 35, wherein the machine instructions further cause the processor to implement the function of enabling the user to determine a position of the thumbnail image in the Web page.

\* \* \* \* \*